United States Patent
Narasipur (10) Patent No.: US 9,648,811 B2
(45) Date of Patent: May 16, 2017

(54) SEQUENTIAL AND CYCLIC AEROPONIC SYSTEM

(71) Applicant: Venkatesh H Narasipur, Bangalore (IN)

(72) Inventor: Venkatesh H Narasipur, Bangalore (IN)

(*) Notice: Subject to any disclaimer, the term of this patent is extended or adjusted under 35 U.S.C. 154(b) by 198 days.

(21) Appl. No.: 14/472,103

(22) Filed: Aug. 28, 2014

(65) Prior Publication Data
US 2016/0057950 A1 Mar. 3, 2016

(51) Int. Cl.
*A01G 31/02* (2006.01)

(52) U.S. Cl.
CPC ............ *A01G 31/02* (2013.01); *Y02P 60/216* (2015.11)

(58) Field of Classification Search
CPC ........ A01G 31/02; A01G 31/00; A01G 27/00; A01G 27/001; A01G 27/003; A01G 27/008
USPC .......................... 47/62 A; 137/256, 312, 314
See application file for complete search history.

(56) References Cited

U.S. PATENT DOCUMENTS

| | | | | |
|---|---|---|---|---|
| 3,841,023 A * | 10/1974 | Carlyon, Jr. | ........... | A01G 9/023 239/20 |
| 4,021,964 A * | 5/1977 | Darwin | ................... | A01G 31/02 47/62 R |
| 4,209,943 A * | 7/1980 | Moeller | ................... | A01G 9/18 47/1.4 |
| 4,300,311 A * | 11/1981 | Marchant | ............... | A01G 31/02 137/430 |
| 4,332,105 A | 6/1982 | Nir | | |
| 4,669,217 A * | 6/1987 | Fraze | .................. | A01G 31/001 47/59 R |
| 4,813,176 A | 3/1989 | Takayasu | | |
| 4,869,019 A | 9/1989 | Ehrlich | | |
| 5,136,804 A | 8/1992 | Rothem | | |
| 5,724,768 A | 3/1998 | Ammann, Jr. | | |
| 6,000,173 A * | 12/1999 | Schow | ................... | A01G 31/02 47/59 R |
| 6,807,770 B2 * | 10/2004 | Wainwright | ........... | A01G 31/02 239/214 |
| 7,832,142 B1 * | 11/2010 | Olson | .................... | A01G 31/02 137/624.11 |
| 8,261,486 B2 * | 9/2012 | Bissonnette | ......... | A01G 27/003 47/59 R |
| 8,291,639 B2 | 10/2012 | Gardner | | |

(Continued)

*Primary Examiner* — Monica Williams
*Assistant Examiner* — Morgan T Barlow
(74) *Attorney, Agent, or Firm* — Shalini Venkatesh (57) ABSTRACT

Embodiments generally relate to systems and methods for aeroponic plant growth involving closed loops of growing units linked by plumbing sections. The system comprises N growing units, where N is an integer greater than 1; and N–1 supply plumbing sections that each connects one of the growing units to another, such that a linear array of N growing units linked by supply plumbing sections is formed. The system further comprises one drain plumbing section connecting the Nth growing unit to the first growing unit, so forming a closed loop of N growing units linked by N–1 supply plumbing sections and the drain plumbing section; and an electronic cyclic sequencer. Each of the growing units comprises an enclosure containing a submersible pump and a spray manifold, the electronic cyclic sequencer being operatively connected to each of the N submersible pumps.

6 Claims, 10 Drawing Sheets

(56) References Cited

U.S. PATENT DOCUMENTS

| | | | |
|---|---|---|---|
| 2005/0011118 A1* | 1/2005 | Umbaugh | A01G 31/02 47/61 |
| 2007/0094754 A1* | 4/2007 | Jeong | A01H 4/005 800/317.2 |
| 2009/0126269 A1* | 5/2009 | Wilson | A01G 31/00 47/62 R |
| 2009/0260282 A1* | 10/2009 | Hashimoto | A01G 9/045 47/20.1 |
| 2010/0218423 A1* | 9/2010 | Walhovd | A01G 31/02 47/62 A |
| 2012/0005957 A1 | 1/2012 | Downs, Sr. | |
| 2012/0085026 A1 | 4/2012 | Morris | |
| 2013/0074408 A1* | 3/2013 | Singh | A01G 31/02 47/62 E |
| 2013/0160363 A1* | 6/2013 | Whitney | A01G 31/02 47/59 S |

\* cited by examiner

SEQUENTIAL AND CYCLIC AEROPONIC SYSTEM

BACKGROUND

Many hydroponic systems involve the recovery and re-use of an aqueous nutrient. Aeroponic systems, in which plant roots are suspended in air in an enclosure and nutrient is sprayed onto the roots in the form of a mist or fine drops, make up one sub-category of such systems. Another sub-category is "Ebb and Flow" systems, in which plants are placed in a medium such as expanded clay pellets in a growing tray at the top of a growing chamber, connected to a nutrient reservoir. The aerated nutrient is alternately pumped to flood the roots in the growing tray, and allowed to drain back into the reservoir thereby exposing the roots to fresh air drawn from outside.

Ebb and flow systems require a relatively large volume of nutrient, to ensure that the medium holding the plant roots can be adequately flooded. Another disadvantage of ebb and flow systems is inadequate aeration. In particular, the plant roots may grow sufficiently dense to cause nutrient trapping and air depletion, which may lead to diseases such as root rot.

Aeroponic systems have been developed to address the issues of inadequate aeration and high nutrient volume by keeping the plant roots suspended in air, and delivering nutrient directly to the roots in the form of a nutrient spray. They generally use submersible pumps to pump the nutrient from a pool at the base of the growing chamber to nozzles positioned closer to the roots and directed towards the roots. However, as the roots grow down, the roots may get submerged in the pool of nutrient, where oxygen content is intrinsically low. Hence it is generally necessary to provide aeration within the pool, and support from external aeration systems like air pumps or bubblers may be required. An alternate configuration in aeroponic systems is to grow the roots entirely in nutrient mist, using a high pressure pump in an external reservoir to feed the nozzles with the nutrient. After spraying, residual nutrient is returned to the external reservoir. These systems are relatively complex, and more suitable for large gardens where a great many plants are to be supported.

Another problem with current aeroponic systems is that their performance is seriously affected by any blockages occurring in the spray nozzles. Detecting and correcting such blockages is a time consuming and inconvenient manual process, especially in large gardens.

There is therefore a need for a simple and reliable aeroponic system that is scalable for small and large gardens, requires relatively low volumes of nutrient and water, and provides improved aeration and expulsion of stale air without the use of external aeration systems or reservoirs. Ideally, such a system would also be flexible (for example, allowing convenient adjustment of the nutrient as and when necessary), and be reliable in operation, with improved tolerance to nozzle blockage.

SUMMARY

Embodiments generally relate to systems and methods for aeroponic plant growth involving closed loops of growing units linked by plumbing sections.

In one embodiment, the system comprises N growing units, where N is an integer greater than 1; N−1 supply plumbing sections that each connect one of the growing units to another, such that a linear array of N growing units linked by supply plumbing sections is formed; one drain plumbing section connecting the Nth growing unit to the first growing unit, so forming a closed loop of N growing units linked by N−1 supply plumbing sections and the drain plumbing section; and an electronic cyclic sequencer. Each of the growing units comprises an enclosure containing a submersible pump and a spray manifold, the electronic cyclic sequencer being operatively connected to each of the N submersible pumps.

In another embodiment, the method comprises sequentially and cyclically operating a plurality of submersible pumps in a corresponding plurality of growing unit enclosures in a corresponding plurality of growing units connected in a closed loop, each enclosure containing a spray manifold. The sequential and cyclic operation comprises for a first period, activating the submersible pump in a first one of the plurality of growing unit enclosures to deliver nutrient from the first one of the plurality of growing unit enclosures to the spray manifold in a second one of the plurality of growing unit enclosures, while the submersible pump in the second one of the plurality of growing unit enclosures is deactivated.

In another embodiment, the sequential and cyclic operation additionally comprises for the first period, keeping the submersible pump in a third one of the plurality of growing unit enclosures deactivated; and for a second period, activating the submersible pump in the second one of the plurality of growing unit enclosures to deliver nutrient from the second one of the plurality of growing unit enclosures to the spray manifold in the third one of the plurality of growing unit enclosures, keeping the submersible pumps in the first and third ones of the plurality of growing unit enclosures deactivated.

In another embodiment, where the number of growing units in the plurality is N, the sequential and cyclic operation additionally comprises for the first period, keeping the submersible pump in each of the N growing unit enclosures except for the first one of the plurality of growing unit enclosures deactivated; and for the Nth period, activating the submersible pump in the Nth one of the plurality of growing unit enclosures to deliver nutrient from the Nth one of the plurality of growing unit enclosures to the spray manifold in the first one of the plurality of growing unit enclosures, keeping the submersible pump in each of the N growing unit enclosures except for the Nth one deactivated.

In another embodiment, the system comprises a pump connected to a suction manifold and a delivery manifold and a two-dimensional array of N growing units. The array comprises X rows having N/X growing units in each row; and Y columns having N/Y growing units in each column. Each column comprises a suction collector plumbing section, a delivery distributor plumbing section, a suction solenoid valve, and a delivery solenoid valve, the suction collector plumbing section, delivery distributor plumbing section, suction solenoid valve, and delivery suction valve being connected to each of the N/Y growing units in that column. The system further comprises an electronic cyclic sequencer, operatively connected to each of the suction solenoid valves and delivery solenoid valves. Each of the N growing units comprises an enclosure containing a spray manifold and a lid assembly. The suction manifold and the delivery manifold are connected to each of the Y columns of growing units.

A further understanding of the nature and the advantages of particular embodiments disclosed herein may be realized by reference to the remaining portions of the specification and the attached drawings.

DETAILED DESCRIPTION OF EMBODIMENTS

Embodiments described herein enable a user to provide aqueous nutrient to growing plants efficiently, conveniently, and with improved expectation of plant health. As will be described in greater detail below, a plurality of growing units are connected in a loop, and nutrient is delivered from one unit to another in a sequential and cyclic manner.

Figure 1:
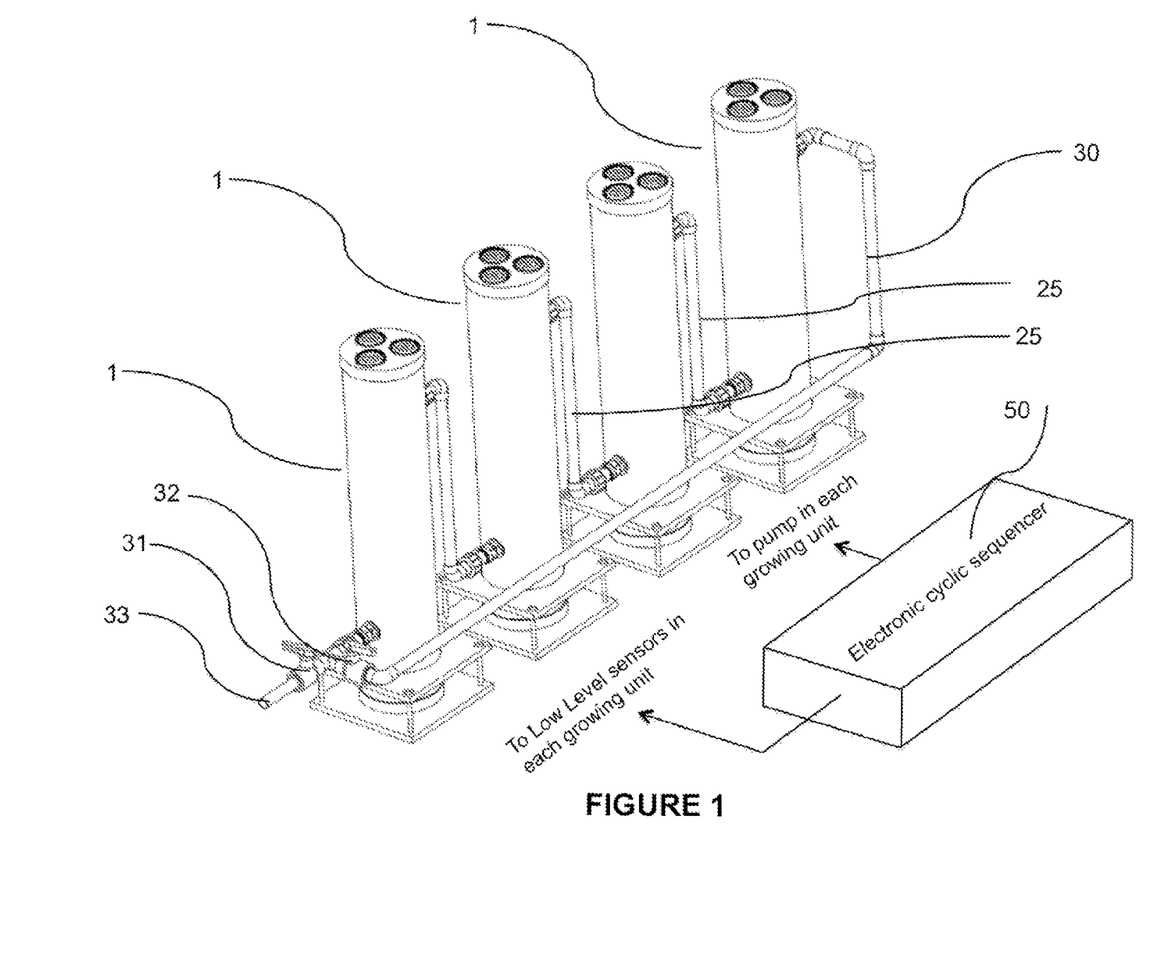
FIG. 1 is a perspective view showing a loop of interconnected growing units according to one embodiment

FIG. 1 is a perspective view showing a system according to one embodiment, comprising four growing units 1, each growing unit consisting of an enclosure 2, and a lid assembly 3. Growing units 1 are interconnected by a network of plumbing sections, with three supply plumbing sections 25, one connecting the first growing unit (at the right end of the line of units) to the second growing unit (adjacent the first), a second one connecting the second growing unit to the third, and a third one connecting the third growing unit to the fourth. A drain plumbing section 30 connects the fourth growing unit to the first, thus forming a closed chain or loop of growing units. While four growing units are shown in this embodiment, other embodiments may include any number greater than one. Also, while the units are shown positioned along a line, other embodiments may include units positioned in other arrangements, but as long as each unit is connected to two and only two others, and a closed loop is formed, the arrangement will be defined for the purposes of this specification to be a linear array.

In some embodiments, nutrient is delivered to the spray manifold of only one of the plurality of growing units in the array at any one time. These may be termed "single fill" embodiments. In other embodiments, termed "multiple fill" embodiments, nutrient is delivered to spray manifolds in more than one—but fewer than all—of the growing units in the linear array at a time. In the latter case, the ratio of the total number of growing units in the array to the number of growing units whose spray manifolds are addressed at the same time may be an integer value. For example, the spray manifolds in ½ or ⅓ or ¼ of all the growing units may be addressed at any one time.

Figure 2:
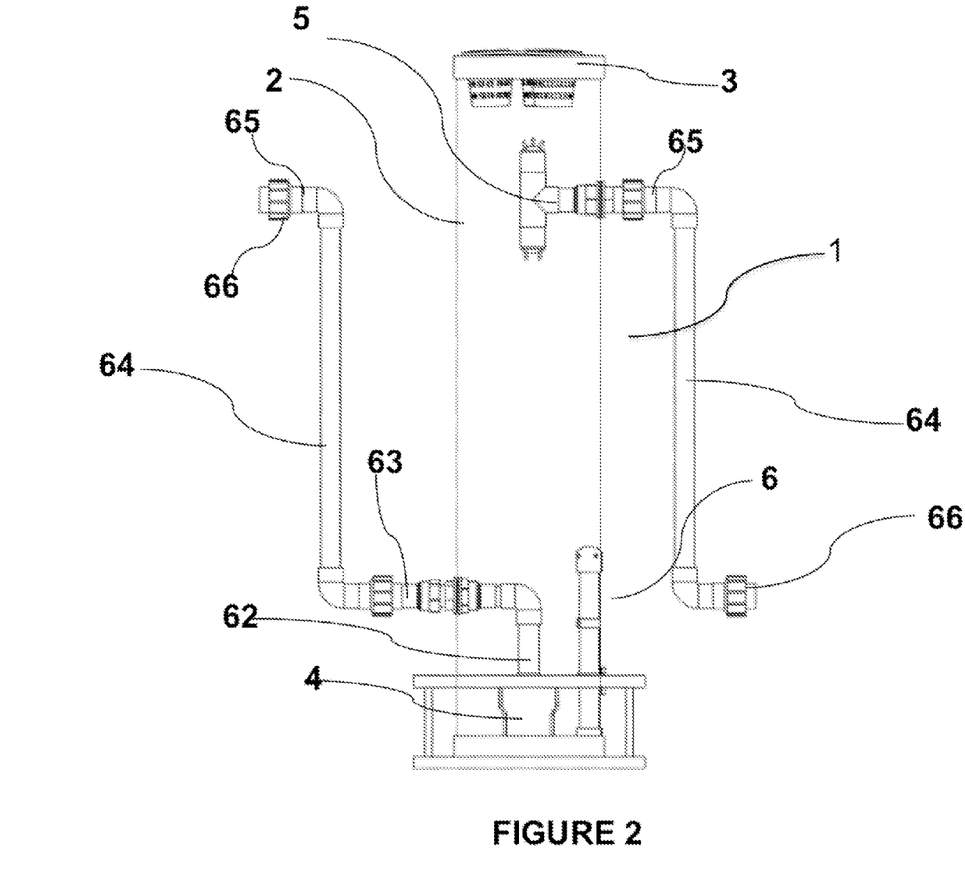
FIG. 2 is a cross-section view of one growing unit according to one embodiment.

FIG. 2 shows a growing unit 1 and its connections in greater detail.

In some embodiments, each enclosure 2 is made of opaque plastic material so that the inside volume in the enclosure is protected from exposure to light. Enclosure 2 is equipped with a submersible pump 4, a spray manifold 5 and, in some embodiments, a low level sensor 6. Submersible pump 4 is installed on the base of the enclosure 2. The function of submersible pump 4 is to pump the nutrient at high pressure from one growing unit to the inlet of the spray manifold in the next growing unit, either through one of the supply plumbing sections 25 or through drain plumbing section 30. Spray manifold 5, which receives nutrient at high pressure from another growing unit, is installed in the upper part of the enclosure. The submersible pumps in the growing units are activated one after other in a cyclic sequence, as will be described further below, under the control of the Electronic Cyclic Sequencer (ECS) 50.

In the embodiment shown in FIG. 2, plumbing section 25 consists of four individual plumbing sections 62, 63, 64 and 65. Unions 66 are provided in plumbing sections 63 and 64 to enable easy connection/disconnection which facilitates assembly, maintenance, repair, and the convenient addition of more growing units to the chain as and when desired. In other embodiments, the detailed makeup of plumbing section 25 may differ from that shown in this figure.

It should be noted that the four growing units of the array shown in FIG. 1 are identical to each other and the various plumbing elements are used repeatedly. The modular nature of the system components in this and other embodiments of the present invention makes the corresponding systems relatively inexpensive and simple to construct, to maintain, and to scale up or down as required Drain plumbing section 30 shown in FIG. 1 connects submersible pump 4 in the last growing unit, on the left hand side of the figure, to the spray manifold in the first growing unit, on the right hand side of the figure. Drain plumbing section 30 has two modes of operation, the normal mode and the drain mode. In the normal mode, drain shut off valve 31 is closed, blocking off drain pipe 33, and inline shut off valve 32 is open, allowing plumbing section 30 to function like any of the supply plumbing sections 25, connecting the high pressure nutrient from the submersible pump in the last growing unit is to the spray manifold in the first growing unit. When drain plumbing section 30 is set to operate in drain mode, inline shut off valve 32 is closed, blocking high pressure nutrient from the submersible pump in the last growing unit from reaching the spray manifold in the first growing unit, and drain shut off valve 31 is open, diverting nutrient to drain pipe 33. In this way, drain plumbing section 30 provides a single point drain facility, providing a convenient single point drain facility, allowing nutrient to be quickly and easily drained away, as and when desired.

Submersible pumps 4 are operated in a sequential and cyclic manner. When pump 4 in the first growing unit (on the right hand end of the line shown in FIG. 1) is activated, nutrient at high pressure is delivered to the inlet of spray manifold 5 in the next growing unit to the left, causing nutrient spray. This operation gradually vacates the nutrient from the first growing unit and gradually fills up the next growing unit. At some subsequent point in time (indicated in some embodiments by detecting the point at which the residual nutrient level in the growing unit that pumps out the nutrient reaches a predetermined low level limit, and in others by the passage of time reaching a predetermined duration) pump 4 in the first growing unit is switched off and pump 4 in the next growing unit, which has been filling up with nutrient, is switched on. This action of switching off the pump in one unit and switching on the pump in the next growing unit is controlled by electronic cyclic sequencer 50, and repeated cyclically, so that each growing unit experiences one nutrient delivery phase and one nutrient receiving phase in each cycle of operation, and the process can continue virtually endlessly through as many cycles as desired.

Figure 3:
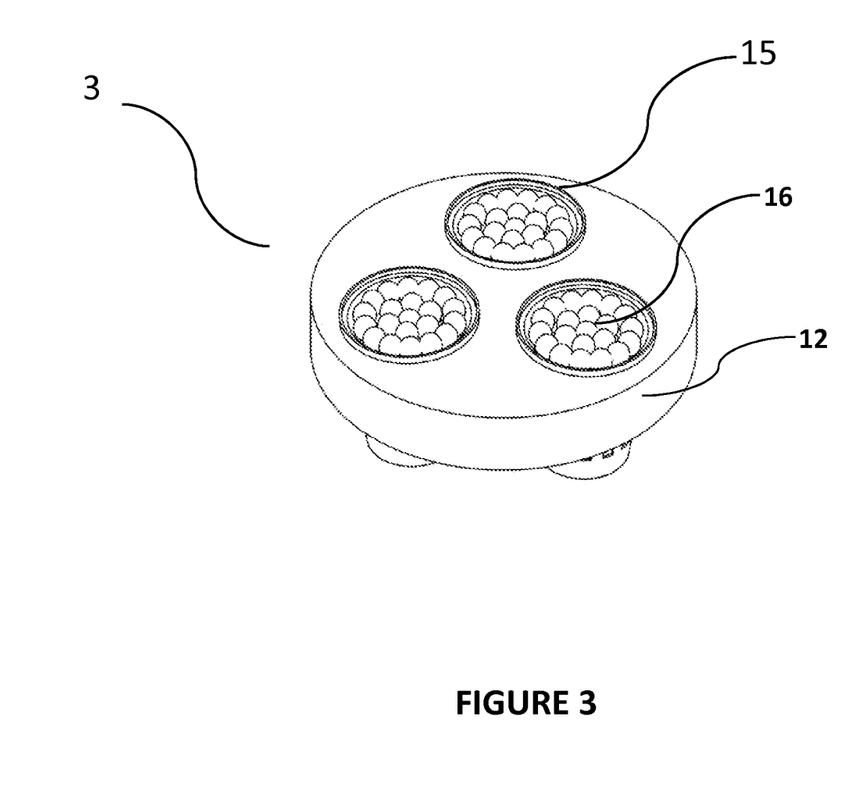
FIG. 3 is a perspective view of a lid assembly according to one embodiment.

FIG. 3 shows details of the lid assembly 3 in embodiments such as those of FIG. 1 and FIG. 2. In the specific embodiment illustrated in FIG. 3, lid 12 is made of an opaque plastic material. When the lid is pressed home over enclosure 2, the lid fits snugly over the enclosure. Lid 12 may include a plurality of apertures for accepting net pots 15. Each net pot 15 is a plastic basket with perforations to allow the roots to grow out from the net pot to the space inside the enclosure 2. The net pot carries the plant with stem and leaves growing above the top of the net pot and the root part growing from inside the net pot down into the space in the enclosure. Expanded clay pellets 16 surround the roots in each net pot to provide a firm support to the plant.

In other embodiments, lid assembly 3 may use inserts instead of clay pellets to hold the plants. The insert may be made of an inert and flexible material like closed cell neoprene, that has sufficient stiffness to hold the plants firmly and at the same time is flexible enough to allow the stems to grow in thickness. The term "lid assembly" should be understood to cover any device that serves the purpose of holding one or more plants in a desired position at the top of a growing unit enclosure.

Figures 4A, 4B, 4C:
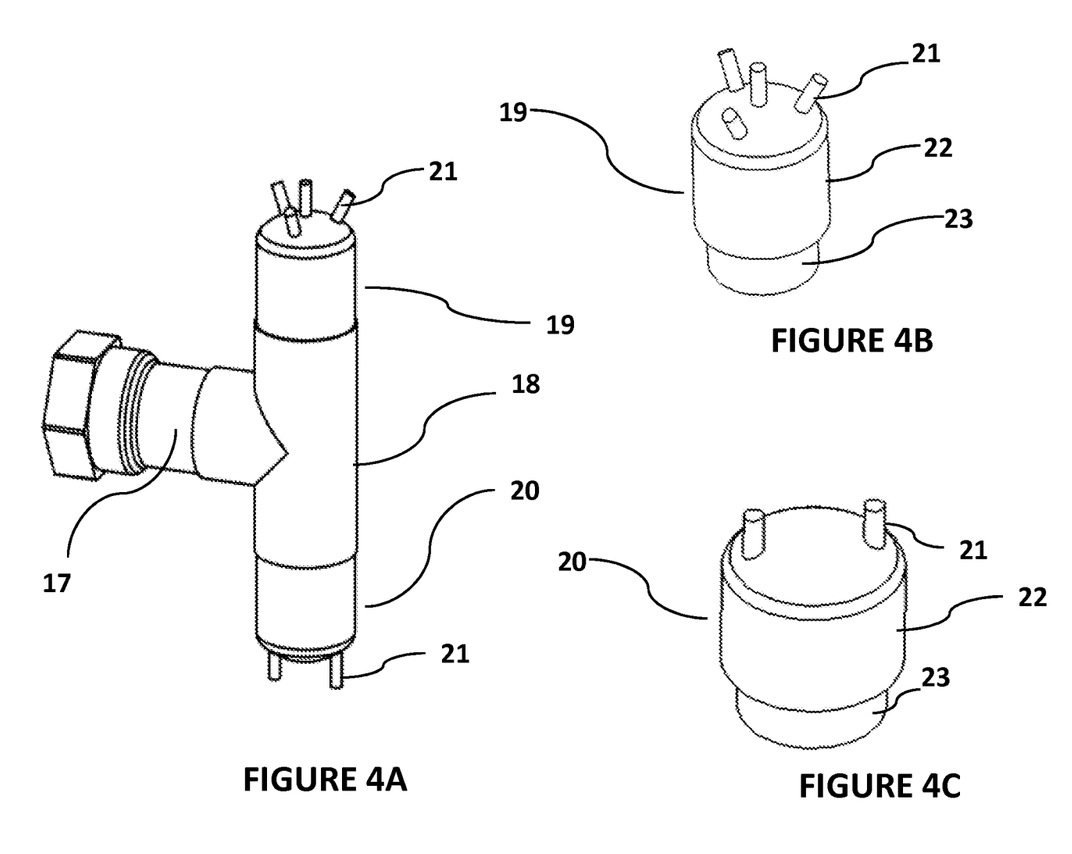
FIGS. 4A, 4B, and 4C are perspective views of the spray manifold according to one embodiment.

FIG. 4A-4C show one embodiment in which spray manifold 5 is fitted with an upward spray head 19 and downward spray head 20. The nozzles 21 of spray head 19 are directed upwards to direct nutrient towards the roots of the plants held in lid assembly 3, and the nozzles 21 of spray head 20 are directed downwards to direct nutrient into the pool of nutrient collected in the enclosure 4 and to agitate that pool, increasing its aeration. In the shown embodiment, spray manifold 5 includes spray manifold plumbing section 17, a TEE fitting 18, as well as spray heads 19 and 20. Spray head 19 consists of cap 22, short pipe 23 and nozzles 21. Spray head 19 is connected to the vertically upward limb of the TEE fitting 18. The direction of the nozzles 21 on the cap of spray head 19 is such that the spray covers the entire roots in the net pots or other devices holding the plants. Spray head 20 also consists of a short pipe 23, cap 22 and nozzles 21. Spray head 20 is connected to the vertically downward limb of the TEE fitting 14. The direction of the nozzles 21 on the cap of spray head 20 is such that the spray agitates the nutrient collected in the enclosure as it is collected therein.

In other embodiments, elements 17 and 18 may be replaced by elements of different shapes and arrangement than those shown, but serving the same purpose of delivering nutrient to the spray heads. Similarly, caps 22 and pipes 23 may be replaced by other elements in other embodiments, but serving the same purpose of delivering nutrient to nozzles 21.

During the period in which the two spray heads 19 and 20 of spray manifold 5 spray nutrient upwards toward the plant roots held in the lid and downwards towards the base of an enclosure 2 respectively, liquid gradually collects in the base of enclosure 2, creating a constant upward draft of air. The liquid nutrient may reach the base directly from the downward-facing spray head, or indirectly from the upward-facing spray head. The indirect path may involve dripping off the plant roots, and/or running down the side walls of the enclosure. In all these cases, the liquid engages with the upward draft of air, becoming aerated much more effectively than nutrient falling through almost still air does, in conventional aeroponic system.

Aeration is further increased by the action of the spray from the downward-facing spray head impinging upon the nutrient already present at the base of the enclosure, and causing agitation. This agitation continues throughout the period that the downward-facing spray head receives nutrient from the pump in the previous growing unit in the sequence.

Moreover, during any period when the nutrient in an enclosure is being pumped out by the pump in that enclosure, the steady outflow of nutrient is accompanied by a steady inflow of fresh air from the environment outside the enclosure into the interior of the enclosure. The thin film of nutrient that remains on the roots of plants in the enclosure is therefore exposed to this fresh air and kept aerated throughout this "spray off" period.

The sequential and cyclic nature of the aeroponic embodiments of the present invention ensures that the nutrient is not only repeatedly aerated but also in continuous motion, which provides a discouraging environment for pathogen growth.

The upward draft of air which is created in an enclosure during the period when that enclosure's spray heads are actively delivering nutrient not only aerates the nutrient spray as described above, but also moves across the roots of the plants held in the lid assembly, flushing out stale air from the root region. In the embodiment of FIG. 3, this stale air escapes through the net pots 16 in lid 3. This flushing out of stale air and replacement with fresh air considerably reduces the occurrence of root rot. The expulsion of stale air occurs even if some of the nozzles 21 of spray heads 19 and 20 are blocked. As long as at least some nutrient is being sprayed into the enclosure and then falls towards the base, stale air will be expelled by the upward draft of air, and plant roots will benefit from the presence of freshly sucked-in air to surround the thin film of nutrient present immediately around those roots. In this way, a reasonably healthy environment may be maintained for the plants, providing time in which nozzle blockages may be identified and corrected.

In some embodiments, each growing unit enclosure 2 includes a low level sensor 6, configured to detect when the level of nutrient within the enclosure drops below a predetermined limit, and to provide a signal to ECS 50 indicating that that limit has been reached. In response to receiving that signal from a first growing unit, ECS 50 deactivates the submersible pump in that growing unit, and activates the submersible pump in a second growing unit to which the first unit is connected, and to which the pump in the first unit has been delivering nutrient.

Figure 5A:
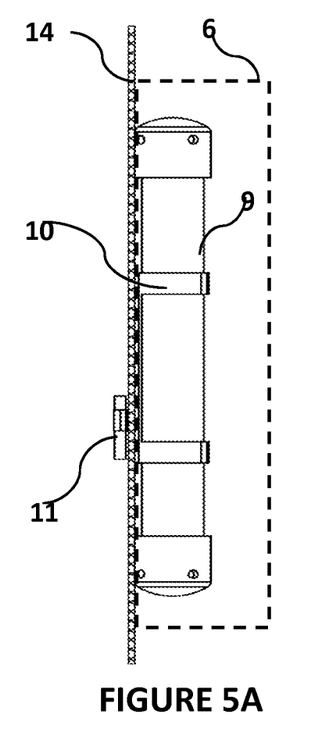
FIGS. 5A, 5B, and 5C are cross-section views showing elements of a low level sensor according to one embodiment.
Figure 5B:
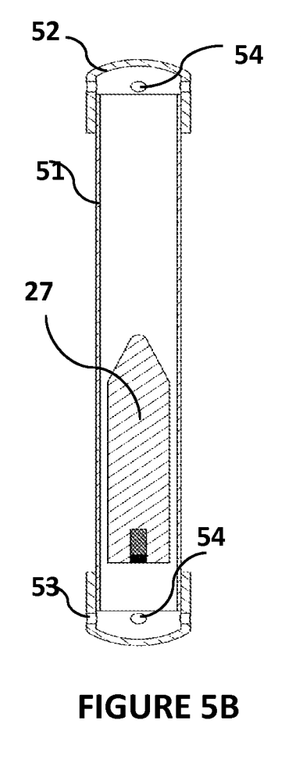
Figure 5C:
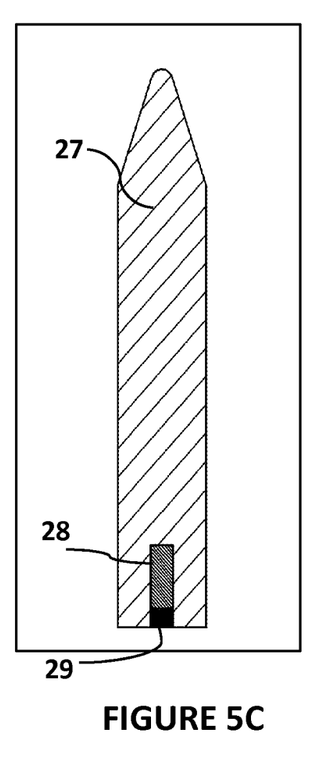

FIG. 5A-5C show details of sensor 6 in one embodiment. The low level sensor 6 shown in FIG. 5A includes float assembly 9 and reed switch 11, installed on either side of the wall of growing unit enclosure 14, float assembly 9 being held in a vertical position close to the wall of the enclosure by clips 10 inside the enclosure. The method of attachment (omitted from the figure for simplicity) may be mechanical (involving hooks, for example) or adhesive (involving epoxy, for example) or some combination of such well known attachment methods.

FIG. 5B shows float assembly 9 including outer float enclosure 51, top end cap 52, bottom end cap 53 and float 27. In some embodiments, 51, 52 and 53 may be made of PVC plumbing pipe sections and fittings. FIG. 5C shows float 27, which may be made of closed cell polyurethane foam or Styrofoam. One end of float 27 is tapered for ease of movement inside float enclosure 51. The other end of the float includes embedded rod magnet 28, oriented along the vertical axis of the float, with the bottom face of magnet 28 sealed with epoxy resin 29 to prevent direct contact between the magnet and the nutrient. Perforations 54 are provided on the top and bottom end caps for free movement of nutrient in and out of float enclosure 51. Float assembly 9 is held in the desired position, with float magnet 28 at the bottom end as shown, by clips 10.

When the level of nutrient in the growing unit rises from an initial level below perforations 54 in bottom end cap 53 to then reach the level of those perforations, nutrient enters float assembly 9 through those perforations and air escapes through perforations in top end cap 52. As the nutrient level continues to rise, float 27 also moves up due to buoyancy and stops only when its tapered end hits top end cap 52. When the nutrient level in the growing unit falls, nutrient in float assembly 9 escapes through the perforations in the bottom cap and eventually air enters float assembly 9 through the perforations in top end cap 52, to fill the space vacated by nutrient. Hence float 27 moves down as the level of nutrient in the growing unit falls. The level of nutrient inside and outside the float assembly always remains equalized. Hence float 27 inside float enclosure 51 moves up and down along with the changes in nutrient level in the growing unit. During the time that the pump in the corresponding growing unit is activated, delivering nutrient to another growing unit, the level of nutrient will keep falling and the float will move down correspondingly. When float 27 reaches a level which brings the magnet sufficiently close to reed switch 11, the contacts of the reed switch will close. Hence, if reed switch 11 is placed at the desired low level sensing position outside the enclosure, it can provide a signal to ECS 50 indicating that the predetermined low level limit has been reached, so that ECS 50 can respond by switching off the pump in the corresponding growing unit enclosure and switching on the pump in the next growing unit enclosure, which has been receiving nutrient up to this point, but must now become a deliverer of nutrient in its turn.

The detailed manner in which reed switch 11 may be configured, and its output signal processed by ECS 50, will be appreciated by those of skill in the art, and will not be discussed in further detail herein. It should also be noted that there are many other types of level sensors well known in the art that could be used instead of or in conjunction with the type of float sensor described above.

Figure 6:
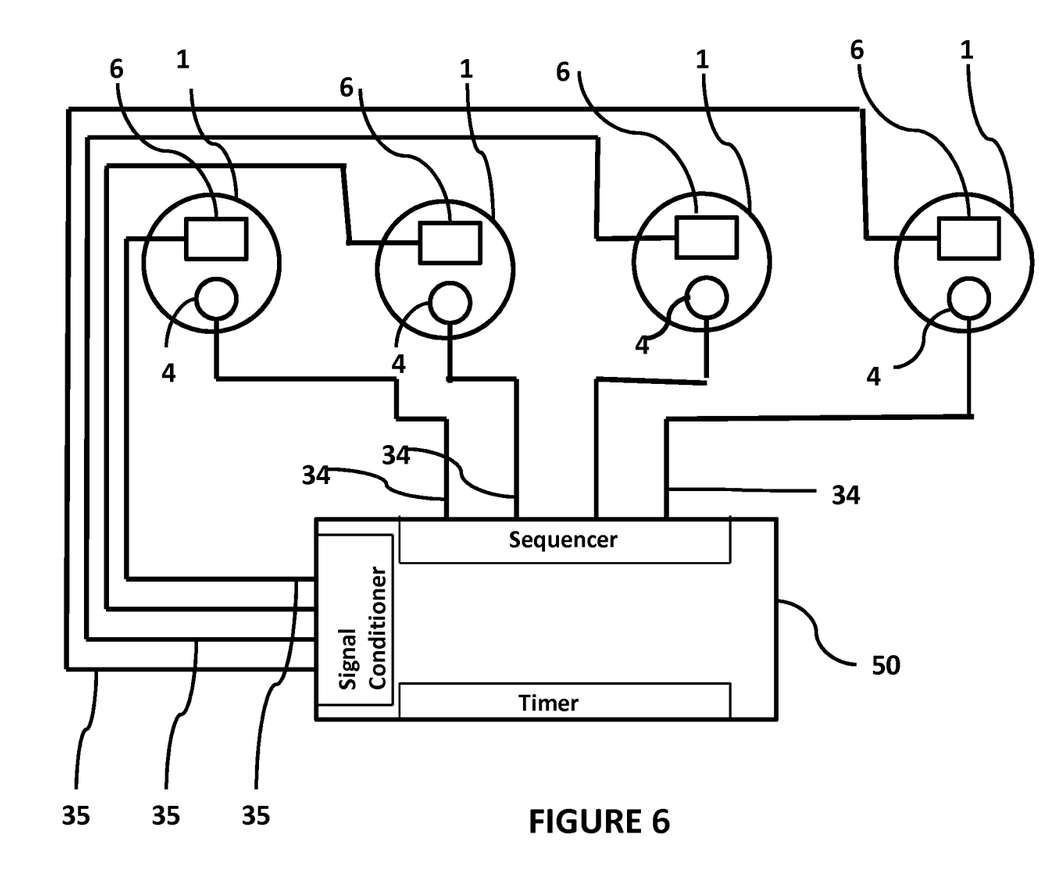
FIG. 6 is a schematic electrical diagram for a single-fill embodiment in which nutrient is delivered to plants in only one growing unit of the plurality at a time.

A schematic diagram of the relationships between the growing units and ECS 50 in one embodiment is shown in FIG. 6. ECS 50 has three functional sections: a sequencer, an input signal conditioner and a timer. The sequencer provides sequentially and cyclically activated output lines 34 each output line 34 being connected to a corresponding pump 4 in a corresponding growing unit 1. In the shown embodiment, output signals generated directly or indirectly from the low level sensor 6 in each growing unit 1 may be transmitted along corresponding input lines 35 connected to the signal conditioner in ECS 50. The signal conditioner is configured to respond to a predetermined characteristic in a sensor output signal received from an input line 35—a change from a low voltage value to a high voltage value for example, provided by reed switch 11—by causing the sequencer to switch off the pump 4 in the growing unit to which the input line 35 carrying that sensor output signal is connected, and switch on the pump in the next growing unit in sequence— the next growing unit being the one which just before that point in time had been receiving nutrient from the pump that has just been switched off. The process is repeated until all the pumps in the sequence have been activated in turn, and then the whole cycle is repeated over and over again.

In some embodiments, the response of the signal conditioner is the generation of a pulse of a predetermined amplitude and width. Each pulse generated by the signal conditioner therefore causes the sequencer to advance by one step in the sequence. In some cases, the generated pulse width may be chosen to have a duration of some predetermined fraction of the maximum time required for the nutrient level in a growing unit delivering nutrient to another growing unit to fall from its maximum, full level to a predetermined low level limit. In one embodiment, the predetermined fraction may be approximately 20%.

The timer in ECS 50 generates pulses at regular intervals. In one embodiment, the interval is chosen to be approximately 20% more than the time interval required for the nutrient in a growing unit to fall from its full level, typically just below the level of the downward facing spray head, to its low level limit.

In some embodiments, the sequencer in ECS 50 may be triggered to advance either by the output pulse from the signal conditioner or by the output pulse from the timer. However, the timer is reset each time the signal conditioner generates a pulse. As the time interval between two consecutive pulses from the signal conditioner is always less than the time interval between two pulses from the timer, and as each pulse from the signal conditioner resets the timer, the timer is repeatedly reset, allowing the pulses from the signal conditioner to trigger the sequencer to advance by one step. Hence, when all the low level sensors 6 are operating normally, the sequencer is advanced only by signals received from the low level sensors connected to the signal conditioner. However, when the signal from any of the low level sensors is not received for any reason, for example because of the failure of that low level sensor, or a defect in the connecting wire, or any other such fault, the signal conditioner will not be able to generate a pulse corresponding to the growing unit with the fault in question. In the absence of a pulse from the signal conditioner being received at the reset input of the timer, the timer will generate a pulse at the end of the time interval set on the timer, and this timer pulse will advance the sequencer by one step. This "watchdog" or back-up arrangement allows the system to continue operating in spite of faults in the low level sensing system, reducing any detrimental effects on the cultivation. In this way, a very desirable fault tolerant feature is provided, which may allow a convenient period of time for identifying the fault and carrying out repairs or replacement.

ECS 50, including the features described above, may be implemented either entirely by hardware using discrete IC chips or through using a micro-controller and software.

In another embodiment, low level sensors 6 and/or input lines 35 to the ECS are either absent or inhibited, so that the sequencer of ECS 50 is advanced in a cyclic sequence entirely based on the output pulses from the timer. In such cases, the time interval between two pulses in the timer is set to the duration normally required for the nutrient level in one growing unit delivering nutrient to another growing unit to fall from its maximum, full level to a predetermined low level limit. Each pulse from the timer advances the sequencer by one step, switching one pump off and the next in sequence on as described above, so the desired sequential and cyclic operation is achieved. The main advantages of this timer-driven system are lower complexity and lower cost, as the use of low level sensors and associated components is avoided. The main disadvantage is that additional operator effort may be required, as the time interval has to be set based on the time required for reaching the low level limit, and factors such as ageing of the components, nozzle inefficiencies, and blockages will affect that time. Hence, timing checks may have to be carried out at regular intervals. However, either type of system may be equally effective.

The various embodiments described above provide an improved method for aeroponic plant growth, in which a plurality of submersible pumps 4 in a corresponding plurality of enclosures 2 in a corresponding plurality of growing units 1 are sequentially and cyclically operated. The growing units 1 are connected in a closed loop, with each growing unit enclosure 2 containing a spray manifold 5. The sequential and cyclic operation comprises, for a first period, activating the submersible pump in a first one of the plurality of growing unit enclosures to deliver nutrient from the first one of the plurality of growing unit enclosures to the spray manifold in a second one of the plurality of growing unit enclosures, while the submersible pump in the second one of the plurality of growing unit enclosures is deactivated.

In some embodiments, the sequential and cyclic operation additionally comprises, for the first period, keeping the submersible pump in a third one of the plurality of growing unit enclosures deactivated; and for a second period, activating the submersible pump in the second one of the plurality of growing unit enclosures to deliver nutrient from the second one of the plurality of growing unit enclosures to the spray manifold in the third one of the plurality of growing unit enclosures, keeping the submersible pumps in the first and third ones of the plurality of growing unit enclosures deactivated.

The method can clearly be applied to any number N of growing units where N is greater than one, and where, for the Nth period, the submersible pump 4 in the Nth one of the plurality of growing unit enclosures is activated to deliver nutrient from the Nth one of the plurality of growing unit enclosures to the spray manifold in the first one of the plurality of growing unit enclosures, keeping the submersible pump in each of the N growing unit enclosures except for the Nth one deactivated. In this way, one full cycle of operation is completed, and the whole process may be repeated over and over again.

The above described embodiments are "single fill" embodiments, in which nutrient is delivered to the spray manifold of only one of the plurality of growing units in an array at any one time. In "multiple fill" embodiments, nutrient is delivered to spray manifolds in more than one of the growing units in the array at any one time. A subset of such multi-fill cases includes arrays with a total number of growing units that is an exact multiple of the number of units to which nutrient is to be simultaneously delivered. In this subset of cases, the sequential and cyclic operation of the present invention is relatively simple to understand, as described below.

In the case where there are 4 growing units, for example, it may be desirable for the pumps in the first and third growing units to be operated simultaneously during a first period, delivering nutrient to the second and fourth growing units respectively, while the pumps in the second and fourth growing units are deactivated. In the second period, the sequencer in ECS 50 would advance, switching off the pumps in the first and third growing units and switching on the pumps in the second and fourth growing units, thus delivering nutrient to the third and first growing units respectively. In the third period, the sequencer would switch off the pumps in the second and fourth growing units, and switch on the pumps in the third and first growing units; and in the fourth period, the sequencer would switch off the pumps in the third and first growing units, and switch on the pumps in the fourth and second growing units Then the entire cycle would repeat. In this particular case, each growing unit receives nutrient for two of the four periods in the cycle, delivering nutrient for the other two periods. In other cases, where there is a larger number than 4 growing units, and only one pair is activated at any given time, the number of periods during which nutrient is received by any given unit would be a smaller fraction of the total number of periods in the cycle.

Figure 7:
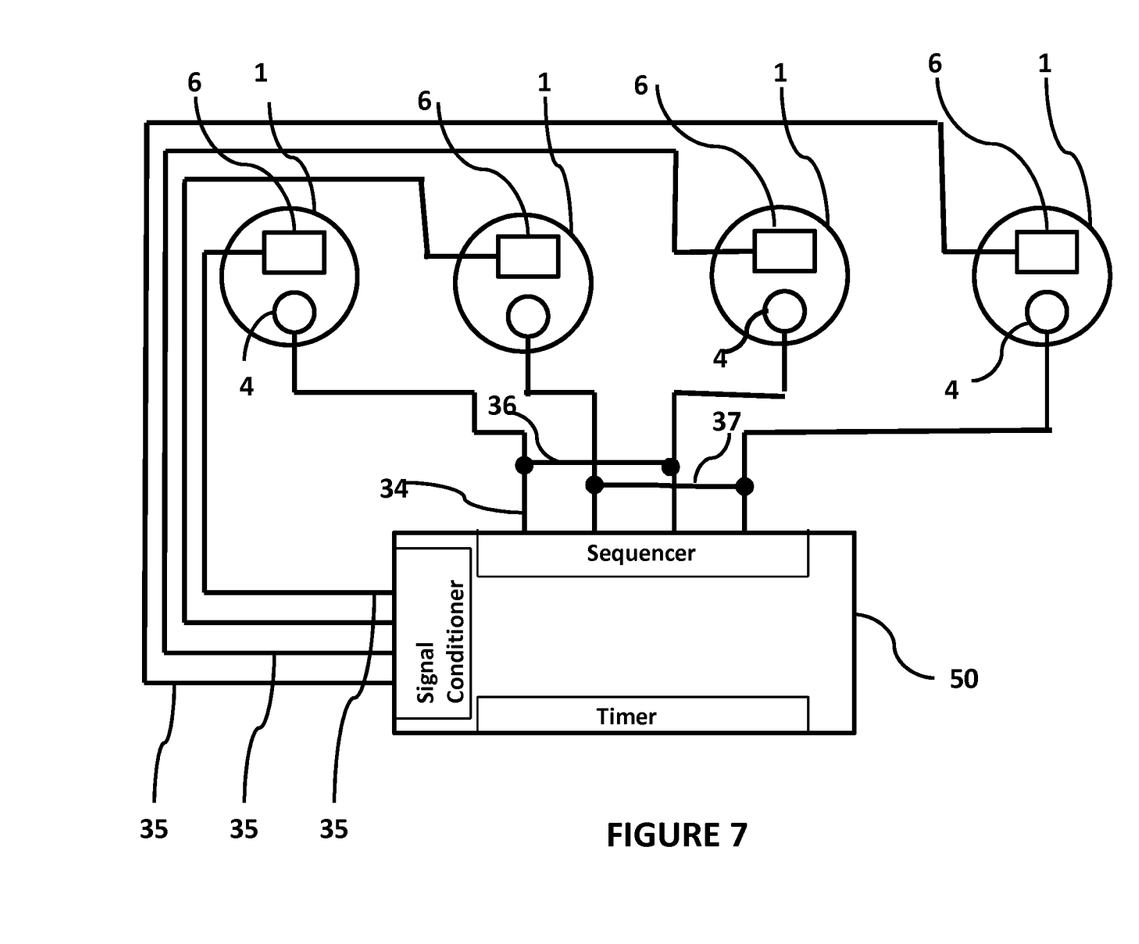
FIG. 7 is a schematic electrical diagram for a multi-fill embodiment.

FIG. 7 is a schematic electrical diagram showing the relationships between the growing units and ECS 50 in one multi-fill embodiment, as discussed above, with 4 growing units. Link 36 connects input lines 34 for the pumps in the first and third growing units in the array, and link 37 connects input lines 34 for pumps in the second and fourth growing units. The links may be made using a junction box (not shown). In some cases, instead of any physical links 36, 37, the sequencer in ECS may be configured to sequentially activate the desired pairs of pumps by sending signals in parallel through the corresponding lines 34.

Other cases with even greater number of growing units connected in a single linear array may be easily envisaged, where 3, 4 or more pumps may be activated during any given period.

However, in all embodiments of this invention, fewer than all (in many cases only one or two) of the growing unit enclosures are filled with nutrient, and the same nutrient circulates through all the units in a cyclic sequence. Hence a relatively small volume of nutrient is required to operate the system for a large number of cycles. Eventually, of course, the nutrient will need to be drained out and replenished, but the reduced volume requirement for each "charge" is a significant advantage of the methods and systems described herein.

In very large installation, the use of a submerged pump 4 in each one of the growing units 1 may be costly and cumbersome. An alternate embodiment of the present invention, shown in FIG. 8, connects a plurality of linear arrays (or chains) of growing units in parallel to form a two-dimensional array of rows and columns of growing units, using a single external pump 59 with electrically operated valves that allows nutrient to be delivered in a sequential and cyclic manner from one column of growing units to the next as will now be described. Solenoid valves would be the most convenient choice for the electrically operated valves in many cases, but other options such as motor-operated valves may be envisaged.

Figure 8:
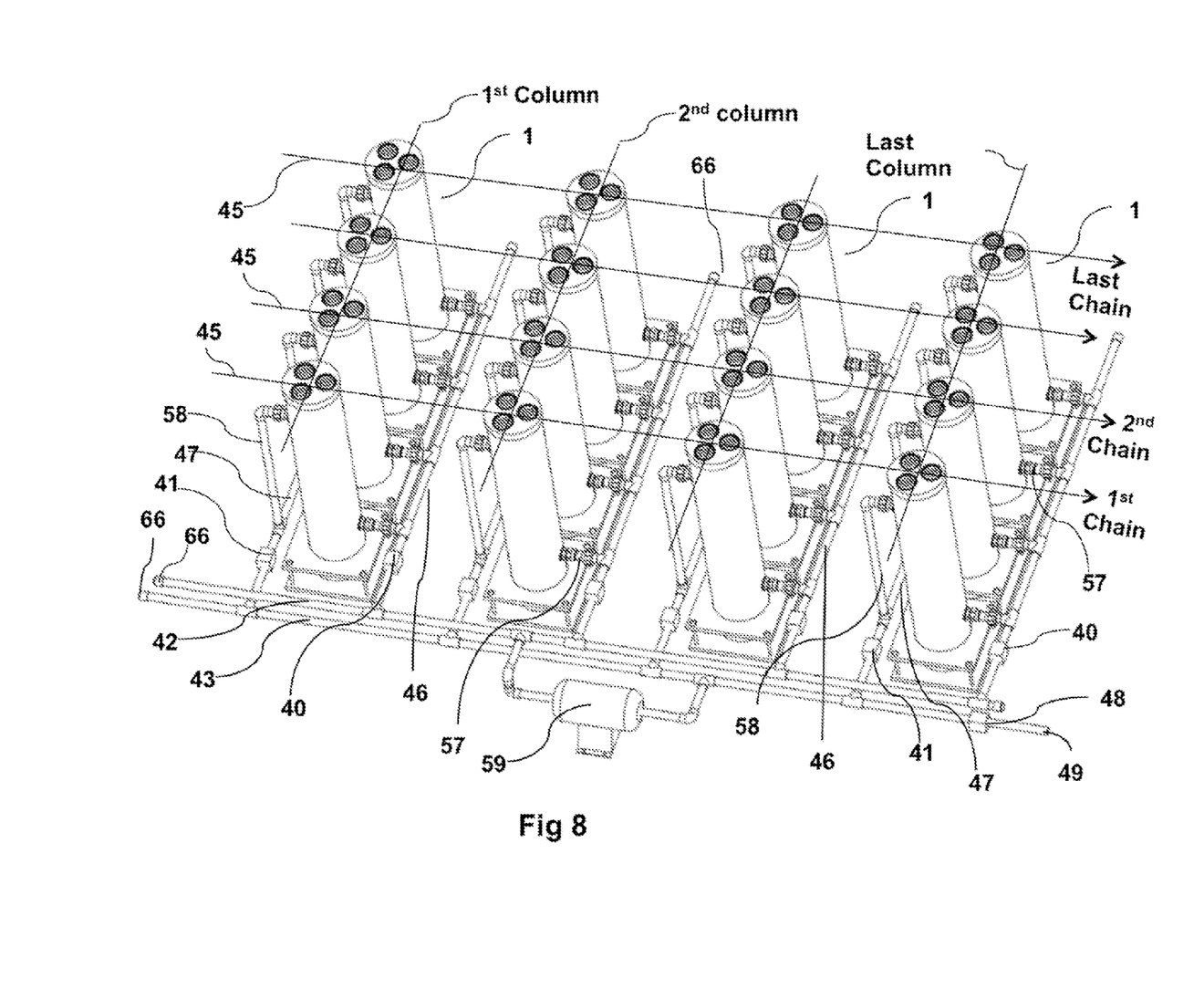
FIG. 8 is a perspective view showing a two-dimensional array of growing units with an external pump according to one embodiment.

Each chain of growing units 45 shown horizontally in FIG. 8 forms a row of the matrix. The first chain of growing units 45 forms the first row, the second chain of growing units 45 forms the second row and so on, the last chain of growing units 45 forming the last row in the matrix. Growing units at the same relative position along each chain form a column of the matrix. All the first growing units counting from the left hand end of each chain form the first column of growing units; all the second units of each chain form the second column of growing units and so on, the growing units at the right hand end of each chain forming the last column of growing units.

Each column of growing units is provided with a suction collector plumbing section 46, a delivery distributor plumbing section 47, a suction solenoid valve (SSV) 40, and a delivery solenoid valve (DSV) 41. A suction collector feed plumbing section 57 connects the base region of each growing unit in each column of growing units to the corresponding suction collector plumbing section 46. The inlet end of SSV 40 in each column is connected to the suction collector plumbing section 46 for that column, and the outlet end of SSV 40 is connected to the suction manifold 42. Suction manifold 42 is also connected to the suction end of external pump 59. The delivery end of external pump 59 is connected to the delivery manifold 43. In each column, the inlet end of DSV 41 is connected to delivery manifold 43 and the outlet end of DSV 41 is connected to the delivery distributor plumbing section 47. Delivery distributor plumbing section 47 is connected to the spray manifold in each growing unit in the corresponding column of growing units through delivery feed plumbing section 58. Free ends of the suction collector plumbing section 46, delivery distributor plumbing section 47, suction manifold 42 and delivery manifold 43 are blocked with end caps 66.

External pump 59, connected to suction manifold 42 and delivery manifold 43, is operated continuously, any nutrient connected to suction manifold 42 being sucked by the pump and pumped out at high pressure into delivery manifold 43

Figure 9:
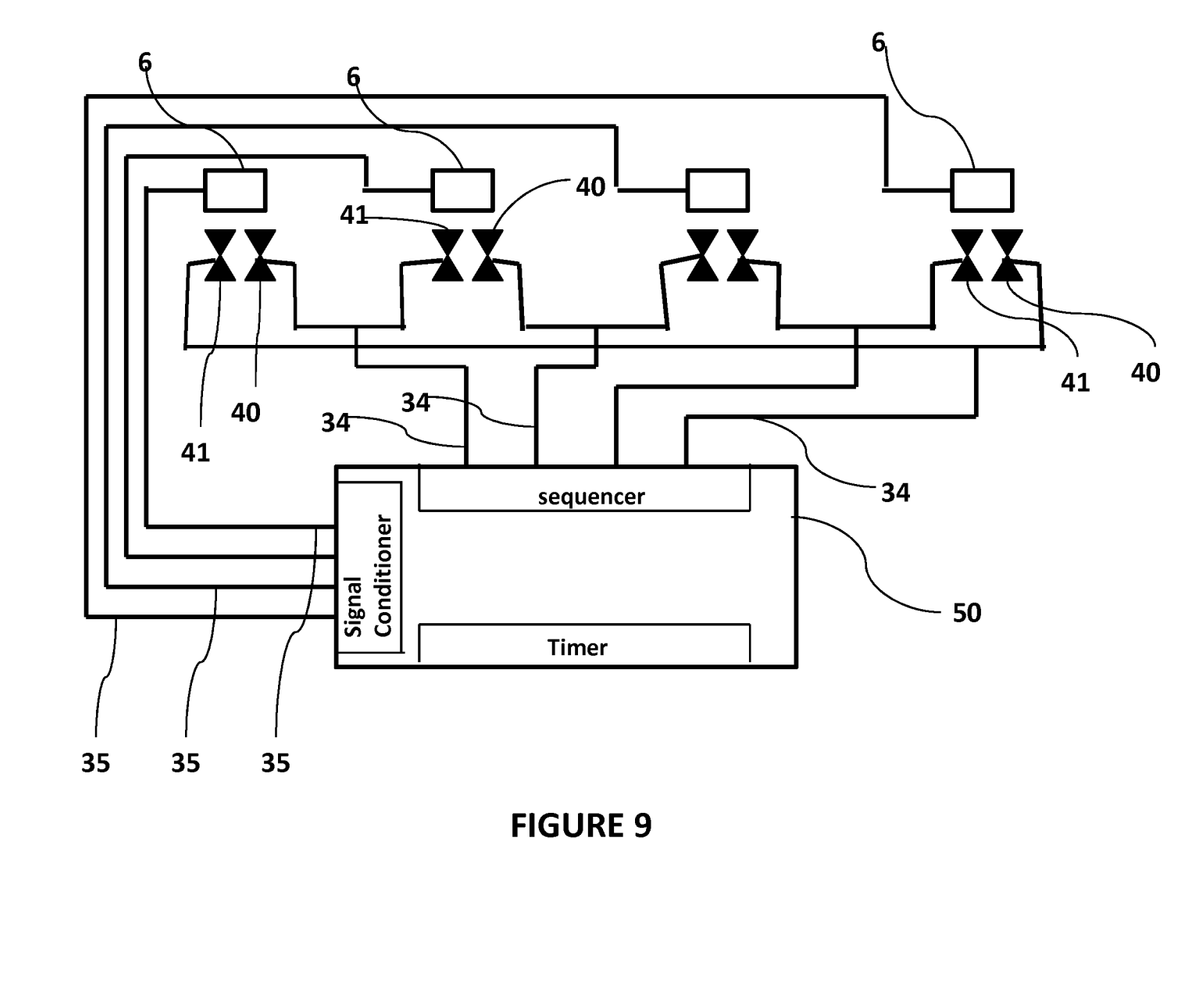
FIG. 9 is a schematic electrical diagram for a two-dimensional array embodiment with one growing unit in each row being filled with nutrient at any one time.

Suction solenoid valve 40 connected to the first column of growing units and delivery solenoid valve 41 connected to the second column of growing units form a first pair of solenoid valves, both being connected to the first output line 34, shown connecting at the extreme left of ECS 50 in FIG. 9. Suction solenoid valve 40 connected to the second column of growing units and delivery solenoid valve 41 connected to the third column of growing units form a second pair of solenoid valves, both being connected to the second output line (counting from the left as shown in FIG. 9) of the ECS 50. Corresponding connections are made for the remaining columns of the array, until the cycle is completed with suction solenoid valve 40 connected to the last column of growing units and delivery solenoid valve 41 connected to the first column of growing units forming the last pair of solenoid valves, both being connected to the last output line in ECS 50.

One growing unit enclosure in each of the Y columns additionally contains a low level sensor operatively connected to the electronic cyclic sequencer. In the case shown, each growing unit in the first chain (row) is equipped with a low level sensor 6, none of the other growing units in the other rows being so equipped. Each low level sensor 6 is connected through a corresponding input line 35 to ECS 50.

FIG. 9 shows a schematic electrical diagram of input signal connections to ECS 50 from low level sensors 6 and the output drive signals from ECS 50 to solenoid valves 40, 41. ECS 50 operates in an endless sequential and cyclic sequence, driving solenoid valve pairs 40 and 41 to also operate in an endless sequential and cyclic sequence. When the first output line 34 of ECS 50 is activated, suction solenoid valve 40 of the corresponding, first column of growing units and delivery solenoid valve 41 of the corresponding, second column of growing units are opened, allowing external pump 59 to suck nutrient from the base region of each growing unit in the first column of growing units and delivers that nutrient at high pressure to the corresponding spray manifolds 5 of the growing units in the second column of growing units. When the nutrient level in the first growing unit in the first row reaches a predetermined low level limit, ECS 50 automatically deactivates the first output line 34 and activates the second output line 34. As the first output line 34 is deactivated, the suction solenoid valve 40 connected to the first column of growing units and the delivery solenoid valve 41 connected to the second column of growing units are closed and concurrently the suction solenoid valve 40 connected to growing units in the second column and the delivery solenoid valve connected to the growing units in the third column are opened. Hence, external pump 59 will now suck nutrient from the base region of each growing unit in the second column of growing units and deliver that nutrient at high pressure to the corresponding spray manifolds 5 of the growing units in the third column of growing units.

When the nutrient level in the second growing unit in the first row reaches the low level limit, ECS 50 automatically deactivates the second output line 34 and activates the third output line 34. This operation continues sequentially until, when nutrient level in the growing unit in the first row and in the column before the last column (the last being on the extreme right as shown) falls to the predetermined low level, ECS 50 automatically activates the last output line 34 and deactivates the previous one, allowing suction solenoid valve 40 connected to the growing units in the last column of growing units and delivery solenoid valve 41 connected to the growing units in the first column to be opened. Concurrently, suction valve 40 connected to the column before last column of growing units and delivery solenoid valve 41 connected to the last column of growing units are closed. Hence, nutrient from the growing units in the last column of growing units is sucked out and delivered at high pressure to the spray manifolds 5 of the growing units in the first column of growing units, completing one cycle. This process of sucking nutrient from growing units in one column and delivering that nutrient to growing units in another column can then be endlessly repeated as desired.

In some two-dimensional embodiments, low level sensors 6 may be dispensed with, so that the sequencer in ECS 50 is triggered by timing signals alone, as in the one-dimensional array case discussed above.

The system shown in FIG. 8 includes drain solenoid valve 48 for draining the nutrient from the system. The inlet end of drain solenoid valve 48 is connected to delivery manifold 43 of external pump 59, and the outlet end of drain solenoid valve 48 is connected to delivery pipe 49. When the nutrient in the system needs to be drained, drain solenoid valve 48 may be activated by a switch (not shown) allowing the nutrient in the system to be sucked by external pump 59 and discharged to drain pipe 49. This single point pump assisted drain facility results in easy and fast draining.

In cases where the convenience of remote operation is not of great importance, a manually operated drain valve may be used instead of drain solenoid valve 48.

Figure 10:
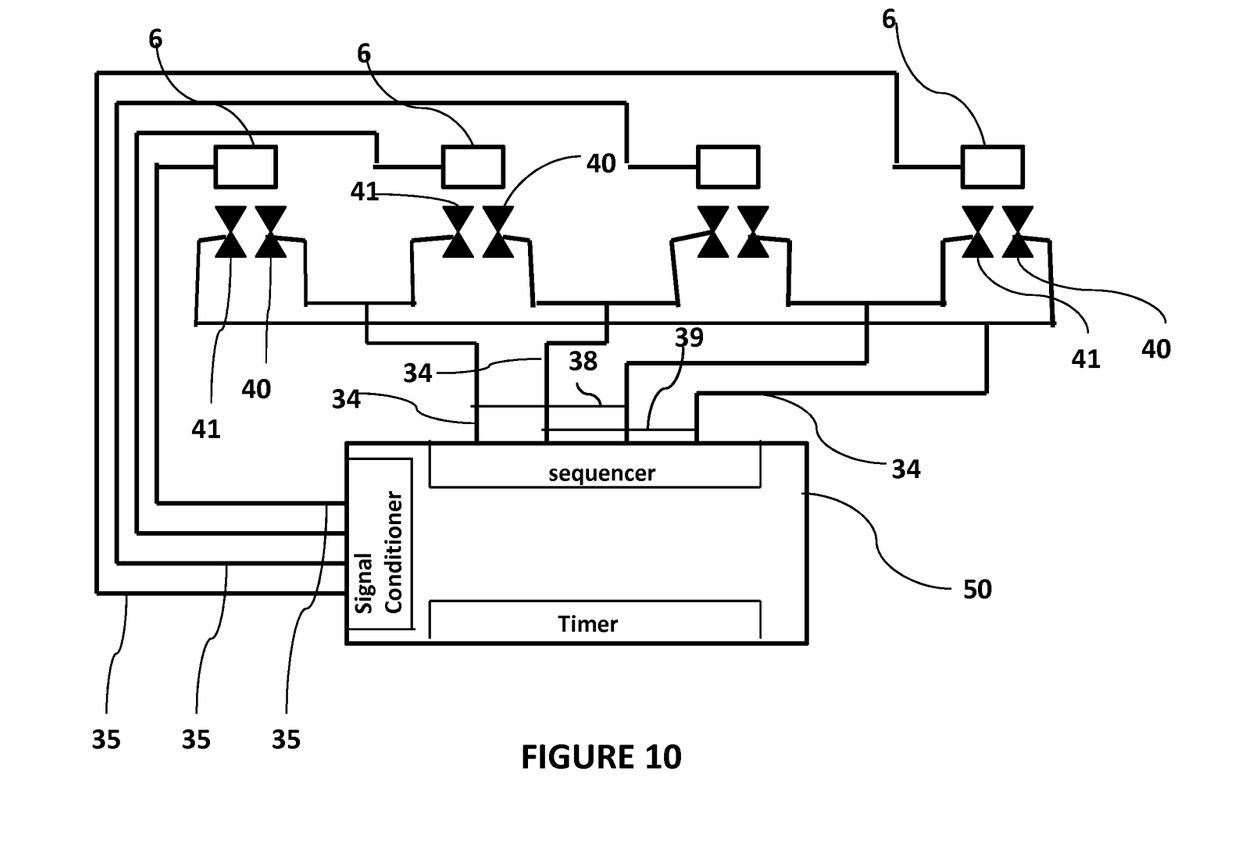
FIG. 10 is a schematic electrical diagram for a two-dimensional array embodiment with two growing units in each row being filled with nutrient at any one time

In some two-dimensional array embodiments of the invention, it may be desirable to deliver nutrient to spray manifolds in more than one growing unit in each row at the same time. As described above for one-dimensional array cases, the ratio of the number of growing units to which nutrient may be delivered at the same time to the total number of growing units in that row may conveniently be an integer value. FIG. 10 is a schematic electrical diagram for one two-dimensional array embodiment in which ½ of the growing units in each row (i.e. 2 of the 4) can be filled with nutrient at any one time. Links 38 and 39 roughly correspond to links 36 and 37 described above with respect to FIG. 7, but in this case links 38 and 39 allow two pairs of valves 40, 41 to be addressed at the same time by the sequencer of ECS 50. Nutrient will therefore be sucked from units in the first and third columns and sprayed to units in the second and fourth columns during one period, sucked from units in the second and fourth columns and delivered to units in the third and first columns in the next period, and so on in an endless cyclic sequence.

Implementation of the various embodiments described above may require decisions to be made by the grower regarding the number of growing units to be connected in a row, whether to operate under single-fill or multi-fill conditions, whether to use a submersible pump in each unit or an external pump with a two-dimensional array arrangement, etc. The results of these decisions, along with other factors such as the number of sprayers, the nutrient discharge rate, the low level sensor settings (if such sensors are used) will determine the effective spray duration and spray repetition rates achieved, and impact the quality of the growing conditions achievable for the plants. The considerations will differ from any one garden to another, and will not be discussed further here.

However, the embodiments described above, regardless of the details of implementation, provide various benefits. In particular, as has been described in greater detail above, embodiments provide increased aeration and, simultaneously, stale air expulsion, a simple modular architecture, low nutrient volume requirements, a single point drain facility, and improved fault-tolerance and reliability.

While the primary concern of this disclosure is aeroponic systems and methods, which necessarily involve the use of spray heads to deliver nutrient in the form of a spray, the use of an electronic cyclic sequencer operatively connected to each of a plurality of growing units and operating almost exactly as discussed above but without the use of spray heads may also be envisaged. The result would be a version of an "Ebb and Flow" system with many of the advantages noted in the previous paragraph over conventional ebb and flow systems.

The above-described embodiments should be considered as examples of the present invention, rather than as limiting the scope of the invention. Various modifications of the above-described embodiments of the present invention will become apparent to those skilled in the art from the foregoing description and accompanying drawings. Accordingly, the present invention is to be limited solely by the scope of the following claims.

I claim:

1. A system for aeroponic plant growth, the system comprising:
   N growing units, where N is an integer greater than 1, each growing unit comprising:
      an enclosure containing a submersible pump and a spray manifold that is not connected to the submersible pump; and
      a lid assembly;
   N−1 supply plumbing sections, each supply plumbing section connecting a submersible pump in a corresponding one of the growing units to a spray manifold in one other of the plurality of growing units, such that a linear array of growing units linked by supply plumbing sections is formed;
   one drain plumbing section connecting the Nth growing unit to the first growing unit, such that a closed loop of N growing units linked by N−1 supply plumbing sections and one drain plumbing section is formed; and
   an electronic cyclic sequencer, operatively connected to each of the N submersible pumps.

2. The system of claim 1 wherein each spray manifold comprises an upward facing spray head and a downward facing spray head.

3. The system of claim 1 wherein each enclosure additionally contains a low level sensor operatively connected to the electronic cyclic sequencer.

4. The system of claim 3 wherein within each enclosure, the low level sensor is positioned near the base of the enclosure.

5. The system of claim 1 wherein each lid assembly is adapted to hold a plurality of plants, configured such that the stems and leaves of the plants are allowed to grow above the lid assembly and the roots of the plants are allowed to pass through the lid assembly into the corresponding enclosure.

6. The system of claim 1 wherein within each enclosure, the spray manifold is positioned near the top of the enclosure.

* * * * *